(12) United States Patent
Francis

(10) Patent No.: US 8,315,202 B1
(45) Date of Patent: *Nov. 20, 2012

(54) SYNCHRONIZED CODE RECOGNITION

(75) Inventor: Mark Francis, Toronto (CA)

(73) Assignee: Ruction Capital Limited Liability Company, Dover, DE (US)

( * ) Notice: Subject to any disclaimer, the term of this patent is extended or adjusted under 35 U.S.C. 154(b) by 566 days.

This patent is subject to a terminal disclaimer.

(21) Appl. No.: 12/467,909

(22) Filed: May 18, 2009

Related U.S. Application Data

(63) Continuation of application No. 10/993,899, filed on Nov. 19, 2004, now Pat. No. 7,545,764.

(51) Int. Cl.
H04B 7/212 (2006.01)

(52) U.S. Cl. ....... 370/324; 370/315; 370/316; 455/12.1; 342/356

(58) Field of Classification Search .................. 370/324, 370/316, 315; 455/12.1; 342/356
See application file for complete search history.

(56) References Cited

U.S. PATENT DOCUMENTS

| | | | |
|---|---|---|---|
| 5,036,334 A * | 7/1991 | Henderson et al. ........... 342/460 |
| 5,103,465 A | 4/1992 | Crisler et al. | |
| 5,111,451 A | 5/1992 | Piasecki et al. | |
| 5,144,296 A | 9/1992 | DeLuca et al. | |
| 5,237,587 A | 8/1993 | Schoolcraft | |
| 5,343,497 A | 8/1994 | Canosi et al. | |
| 5,428,645 A | 6/1995 | Dolev et al. | |
| 5,509,035 A | 4/1996 | Teidemann et al. | |
| 5,528,183 A | 6/1996 | Maturi et al. | |
| 5,825,226 A | 10/1998 | Ferraiolo et al. | |
| 6,091,703 A * | 7/2000 | Saunders et al. ............... 370/210 |
| 6,154,508 A | 11/2000 | Ott | |
| 6,208,291 B1 | 3/2001 | Krasner | |
| 6,252,543 B1 * | 6/2001 | Camp ....................... 342/357.29 |
| 6,295,023 B1 * | 9/2001 | Bloebaum ................ 342/357.62 |
| 6,381,228 B1 | 4/2002 | Prieto et al. | |
| 6,466,164 B1 | 10/2002 | Akopian et al. | |
| 6,473,032 B1 * | 10/2002 | Trimble ................... 342/357.41 |
| 6,473,033 B1 * | 10/2002 | Trimble ................. 342/357.395 |
| 6,476,758 B1 | 11/2002 | Chaput et al. | |
| 6,493,378 B1 * | 12/2002 | Zhodzishsky et al. ........ 375/149 |
| 6,564,046 B1 | 5/2003 | Chateau | |
| 6,701,431 B2 | 3/2004 | Subramanian et al. | |
| 6,807,398 B1 * | 10/2004 | Satoh ........................... 455/13.2 |
| 6,912,651 B1 | 6/2005 | Hamdi et al. | |
| 6,925,285 B2 | 8/2005 | Kim | |
| 7,545,764 B1 | 6/2009 | Francis | |
| 7,623,871 B2 * | 11/2009 | Sheynblat .................. 455/456.1 |

(Continued)

OTHER PUBLICATIONS

Atmel® AT86Z/I3201 Z-Link TM Controller, 8-bit AVR® Microcontroller Customized for IEEE 802.15.4 and ZigBee TM Wireless Systems, Preliminary Summary, 5056CS-WIRE-6/04, 2004; 4 pages.

(Continued)

Primary Examiner — Danh Le
(74) Attorney, Agent, or Firm — Christensen O'Connor Johnson Kindness PLLC

(57) ABSTRACT

A system includes a central controller to transmit a plurality of synchronization codes through a transmission medium and a plurality of satellite controllers, each satellite controller configured to recognize one or more synchronization codes of the plurality of synchronization codes, each satellite controller comprising a synchronous clock signal generator to generate a synchronous clock signal each time the satellite controller recognizes the one or more synchronization codes of the plurality of synchronization codes.

20 Claims, 7 Drawing Sheets

U.S. PATENT DOCUMENTS

| | | | | |
|---|---|---|---|---|
| 2002/0054611 | A1* | 5/2002 | Seta | 370/503 |
| 2003/0219082 | A1* | 11/2003 | Tanaka et al. | 375/324 |
| 2004/0024550 | A1* | 2/2004 | Doerken et al. | 702/79 |
| 2004/0114772 | A1 | 6/2004 | Zlotnick | |
| 2005/0021678 | A1 | 1/2005 | Simyon et al. | |

OTHER PUBLICATIONS

USPTO Requirement for Restriction for U.S. Appl. No. 10/993,899 dated May 12, 2008; 6 pages.

USPTO Non-Final Rejection for U.S. Appl. No. 10/993,899 dated Aug. 14, 2008; 7 pages.

U.S. Appl. No. 10/993,899: "Synchronized Code Recognition," Mark Francis, filed Nov. 19, 2004; 30 pages.

USPTO Notice of Allowance for U.S. Appl. No. 10/993,899 dated Apr. 28, 2009; 2 pages.

USPTO Notice of Allowance for U.S. Appl. No. 10/993,899 dated Jan. 29, 2009; 6 pages.

U.S. Appl. No. 10/993,944: "Synchronous Auto Wake-up Controller," Mark Francis, filed Nov. 19, 2004; 29 pages.

USPTO Non-Final Rejection for U.S. Appl. No. 10/993,944 dated Jun. 8, 2009; 19 pages.

USPTO Non-Final Rejection for U.S. Appl. No. 10/993,944 dated Nov. 24, 2008; 13 pages.

USPTO Final Rejection for U.S. Appl. No. 10/993,944 dated Aug. 5, 2008; 17 pages.

USPTO Non-Final Rejection for U.S. Appl. No. 10/993,944 dated Feb. 15, 2008; 12 pages.

* cited by examiner

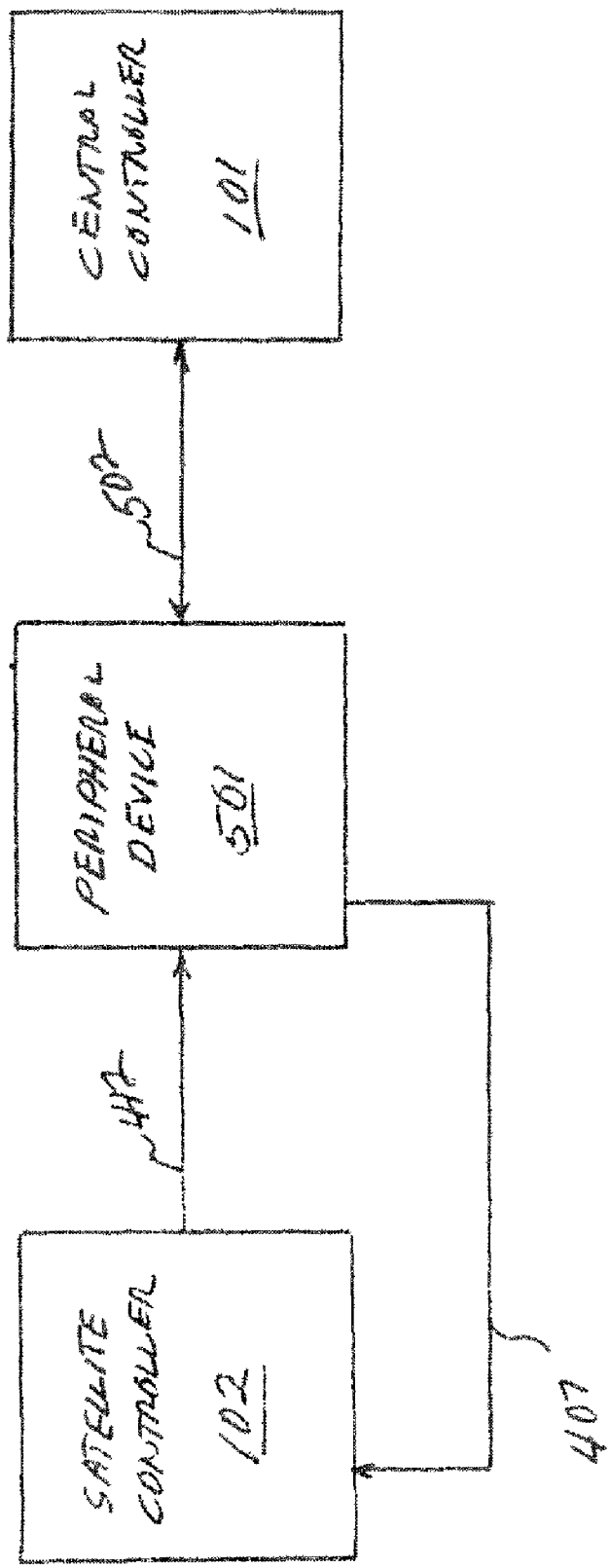

SYNCHRONIZED CODE RECOGNITION

RELATED APPLICATION

This application is a continuation of Ser. No. 10/993,899, now U.S. Pat. No. 7,545,764, filed Nov. 19, 2004.

TECHNICAL FIELD

Embodiments of the present invention relate to the field of device control and, in particular, to the remote control of devices in a time division multiplexed network.

BACKGROUND

Remote control systems are used in applications such as home control, building automation and industrial automation. Typically, a central controller is used to control multiple satellite controllers on a network, which in turn control peripheral devices, systems or subsystems. Each satellite controller has a unique address on the network so it can be individually polled and/or controlled by the central controller. One problem common to these remote control systems is the need to keep the satellite controllers in an active state, ready to receive polling and/or control data, or in a sleep state from which the satellite controllers must first be awakened. Maintaining the satellite controllers in an active state requires power, so there is a constant power overhead cost associated with these systems. If the controllers are battery operated, the power requirements associated with the active state result in shortened battery life and higher system maintenance activity and costs. If the satellite controllers are kept in a sleep or standby state, they may have to be powered up before they can be polled for status or receive control commands, which also increases power consumption. Another problem with existing systems arises when there are large numbers of satellite controllers, each with time-critical tasks that may have to be coordinated with the central controller or other satellite controllers. To maintain synchronization, satellite controllers in a standby or sleep state may have to be awakened regularly, resulting in higher power consumption as noted above. Alternatively, each satellite controller might require a very accurate local time base, adding to the cost of the system as well as increasing the power consumption of the system. Existing systems do not provide a mechanism for verifying clock synchronization without awakening the satellite controllers and/or the peripheral devices they control.

BRIEF DESCRIPTION OF THE DRAWINGS

The present invention is illustrated by way of example, and not by limitation, in the figures of the accompanying drawings in which:

FIG. 5 illustrates one embodiment of synchronized auto-wakeup in a time division multiplexed network.

DETAILED DESCRIPTION

Figure 1:
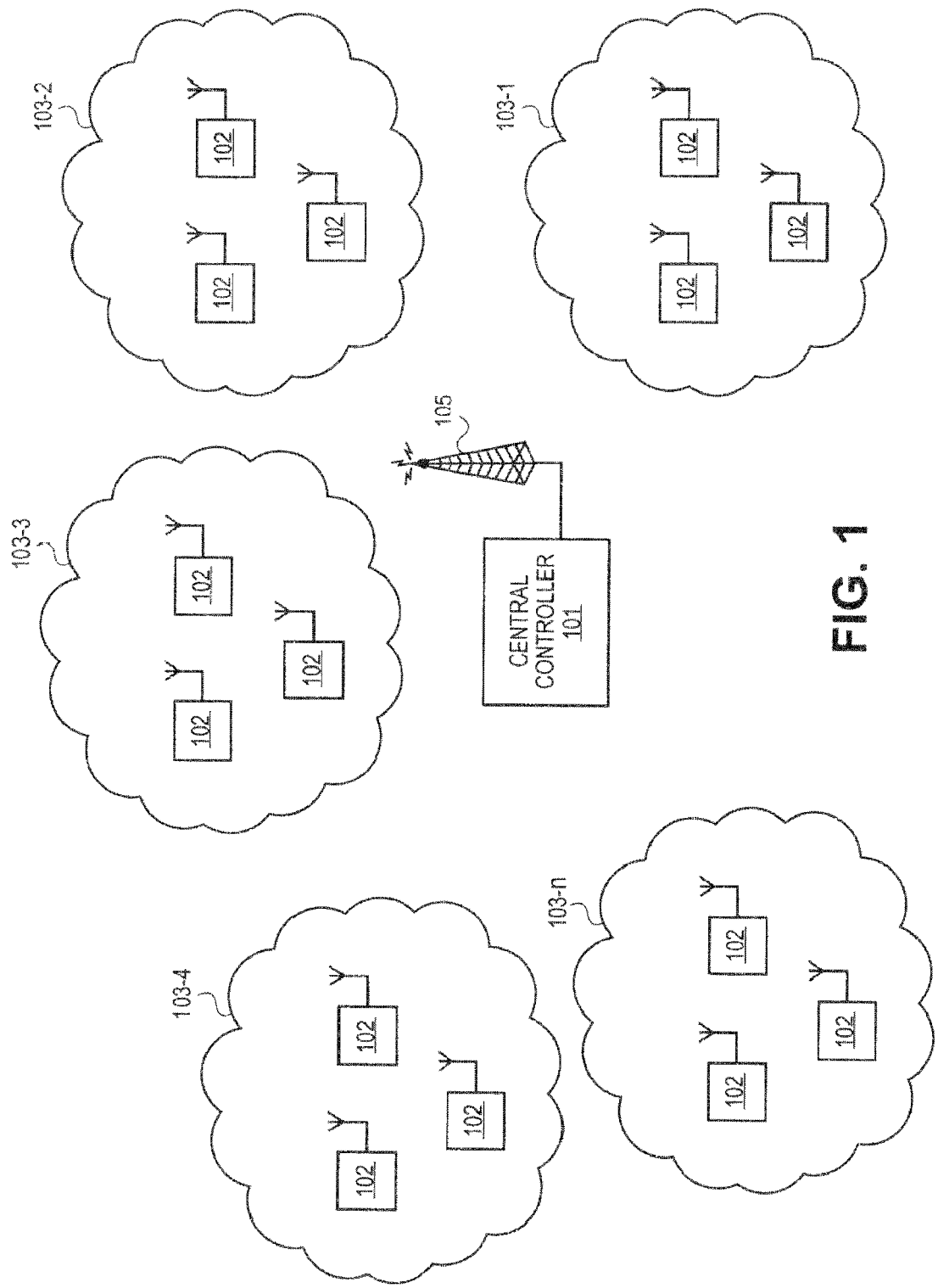
FIG. 1 illustrates one embodiment of a synchronized auto wake-up time division multiplexed network.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, ell-known materials or methods have not been described in detail in order to avoid unnecessarily obscuring embodiments of the present invention. It should be noted that the "line" or "lines" discussed herein, that connect elements, may be single lines or multiple lines. The term "coupled" as used herein, may mean directly coupled or indirectly coupled through one or more intervening components. It will also be understood by one having ordinary skill in the art that lines and/or other coupling elements may be identified by the nature of the signals they carry (e.g., a "clock line" may implicitly carry a "clock signal") and that input and output ports may be identified by the nature of the signals they receive or transmit (e.g., "clock input" may implicitly receive a "clock signal").

A system and method for a synchronized auto wake-up time division multiplexed network are described. In one embodiment, a system includes a central controller to transmit a plurality of synchronization codes over a transmission medium, and a plurality of satellite controllers to receive the synchronization codes. Each satellite controller is configured to recognize one or more of the synchronization codes and includes a synchronous clock signal generator to generate a synchronous clock signal when the satellite controller recognizes the one or more synchronization codes. The plurality of satellite controllers may include one or more groups of satellite controllers and each group of satellite controllers may be configured to recognize a different synchronization code. Each satellite controller in a group of satellite controllers may be configured to recognize the same synchronization code and to generate a synchronous clock signal in response thereto. Each satellite controller in a group of satellite controllers may also include a programmable tuner, coupled to and triggered by the synchronous clock signal generator, wherein each programmable timer times a response from the satellite controller to the central controller. The response of the satellite controller may be timed to avoid interference with a response from any other satellite controller in the satellite controller group and with any other satellite controller in any other satellite controller group.

In one embodiment, the plurality of synchronization signals may be periodic signals, and each satellite controller may include an internal clock signal generator to generate an internal clock signal. Each satellite controller may also include a synchronous comparator to count the synchronous clock signal and the internal clock signal, to compare an internal clock signal count with a synchronous clock signal count and to wake-up a peripheral device if a difference between the internal clock signal count and the synchronous clock signal count exceeds a programmed value.

In one embodiment, a satellite controller may include one or more programmable timers coupled to the synchronous comparator and the internal clock generator. The one or more programmable timers may be triggered by the synchronous clock signal and clocked by an internal clock signal, wherein the programmable timer may switch one or more peripheral devices between a first state and a second state after a programmed delay.

Figure 2:
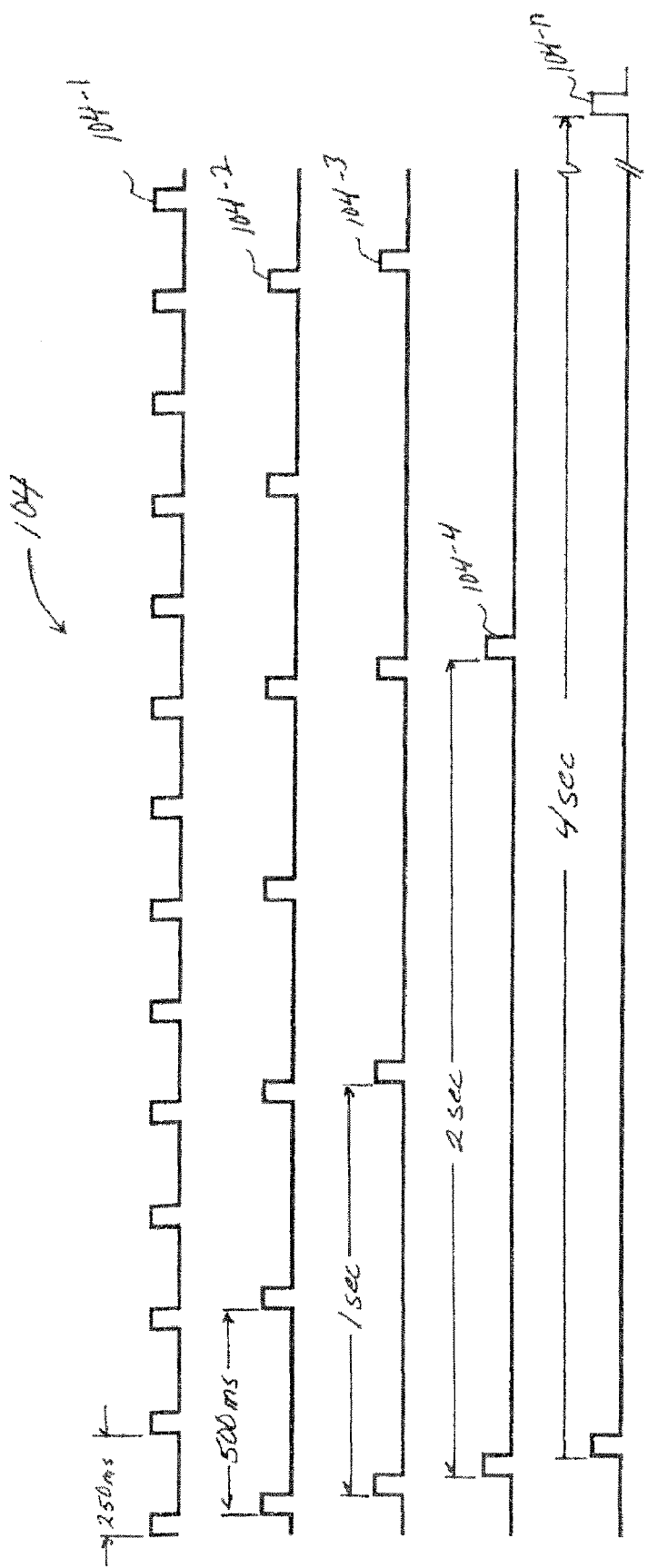
FIG. 2 illustrates a synchronization code timing diagram in one embodiment.

In one embodiment as described above, and as illustrated in FIG. 1, the system may include a central controller 101 and a plurality of satellite controllers 102, which may be organized into one or more groups of satellite controllers 103-1 through 103-$n$. Each group of satellite controllers 103-1 through 103-$n$ may include one or more satellite controllers 102. The central controller 101 may be configured to transmit a series of time division multiplexed synchronization codes 104, as illustrated in FIG. 2, including synchronization codes 104-1 through 104-$n$, which may be an aperiodic series of synchronization codes or a periodic series of synchronization codes. Each satellite controller 102 may be configured to recognize one or more synchronization codes 104-1 through 104-$n$. The synchronization codes 104-1 through 104-$n$ may be transmitted wirelessly by a radio antenna 105 coupled to central controller 101, as shown by way of example in FIG. 1. Alternatively, the synchronization codes 104-1 through 104-$n$ may be transmitted by any other means over any kind of wired or wireless transmission medium, including, for example, optical means and media such as infrared transducers and optical fibers, acoustic means and media such as conventional speakers and microphones or piezoelectric transducers, and cabled means and media such as conventional twisted pair cable or conventional home or industrial power wiring.

In one embodiment, each satellite controller 102 in a group of satellite controllers 103 may be configured to recognize the same synchronization code. For example, satellite controllers 102 in satellite controller group 103-1 may all be configured to recognize synchronization code 104-1. Similarly, satellite controllers 102 in satellite controller group 103-2 may all be configured to recognize synchronization code 104-2, and so on through all of the groups 103-1 through 103-$n$ of satellite controllers 102.

As noted above, the series of synchronization codes 104-1 through 104-$n$ may be periodic. Synchronization codes 104-1 through 104-$n$ may have the same period or different periods. For example, and as shown in FIG. 1, synchronization code 104-1 may have a period of 250 milliseconds (ms), synchronization code 104-2 may have a period of 500 milliseconds, etc. The periods of the periodic synchronization codes 104 may be chosen to be harmonically related to each other. FIG. 2 illustrates a timing diagram 200 for a sequence of periodic signals corresponding to periodic synchronization codes 104-1 through 104-$n$ in FIG. 1. It will be appreciated that each successively longer period may be chosen to be a multiple of every previous shorter period. That is, the period of synchronization code 104-2 (500 ms) may be two times the period of synchronization code 104-1 (250 ms), the period of synchronization code 104-3 (1 second) may be two times the period of synchronization code 104-2 and 4 times the period of synchronization code 104-1, etc. It will be appreciated that maintaining such a harmonic relationship between the periodic synchronization signals may insure that the periodic synchronization signals do not overlap and interfere with one another.

Figure 3:
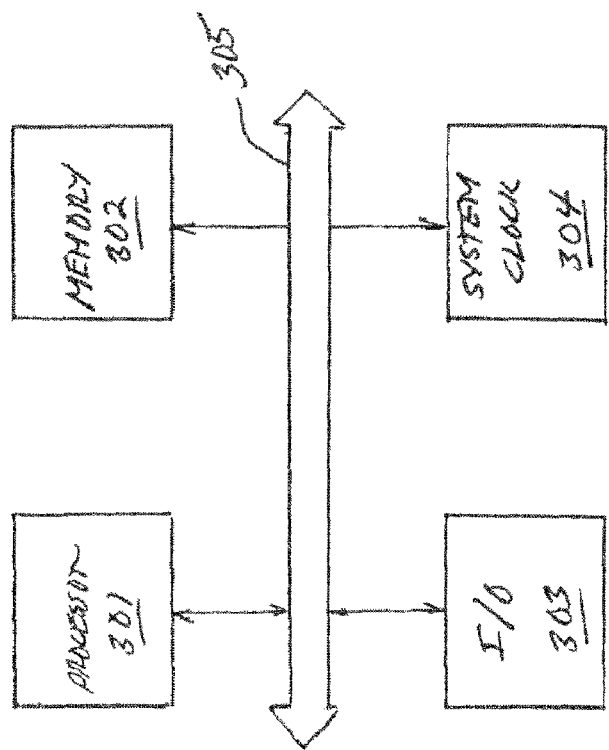
FIG. 3 illustrates a central controller in one embodiment of a synchronized auto wake-up time division multiplexed network.

FIG. 3 illustrates one embodiment of a central controller 300. Central controller 300 may include a processor 301 coupled by a system bus 305 to a memory 302, an input/output (I/O) device 303 and a system clock 304. System bus 305 may include a plurality of buses and lines such as a data bus, an address bus and clock lines in a conventional manner.

Processor 301 may be a general-purpose processor such as an Intel Pentium processor, a Motorola Power PC processor or any similar general-purpose processor. Alternatively, processor 301 may be a special purpose processor such as a field programmable gate array (FPGA), an application specific integrated circuit (ASIC) or a digital signal processor (DSP). Memory 302 may be used for storage of software instructions and related data. Memory 302 may include volatile memory, non-volatile memory or both. Any such volatile memory may be, for example, any type of random access memory (RAM) such as static RAM (SRAM) or dynamic RAM (DRAM). Any such non-volatile memory may be, for example, any type of read only memory (ROM) such as electronically programmable ROM (EPROM) or flash memory, etc. I/O device 303 may be used to communicate with satellite controllers 102. I/O device may be configured to transmit synchronization codes 104 to satellite controllers 102 by, for example, direct modulation of synchronization codes 104 on a carrier wave, which may be, for example, a radio frequency carrier, an optical carrier or an ultrasonic carrier. The modulation may be any convenient form of modulation, analog or digital, including amplitude modulation (AM), quadrature amplitude modulation (QAM), frequency modulation (FM), phase modulation (PM), pulse-width modulation (PWM), pulse-position modulation (PPM), direct sequence spread spectrum (DSSS) and the like. Alternatively, I/O device 303 may be a baseband transceiver configured to transmit synchronization codes 104 directly to satellite controllers 102 over wired interconnections as described above. It should be noted that central controller 300 may also include other components and couplings that have not been illustrated, so as not to obscure an understanding of embodiments of the present invention.

As noted above, each satellite controller 102 may be configured to recognize one or more synchronization codes 104-1 through 104-$n$, and each group of satellite controllers 103-1 through 103-$n$ may be configured to recognize a different synchronization code. Synchronization codes 104-1 through 104-$n$ may be synchronized with system clock 304. Synchronization codes 104-1 through 104-$n$ may be any convenient type of code, and may be of any length commensurate with the time separation of the synchronization codes 104-1 through 104-$n$. For example, a synchronization code 104 may be a pseudorandom number (PN) code, a Gray code, or a sequential binary code. Alternatively, a synchronization code 104 may be a truncated media access control (MAC) address, or similar hardware address, corresponding to a range of hardware addresses represented by a group of satellite controllers 103-1 through 103-$n$.

Figure 4:
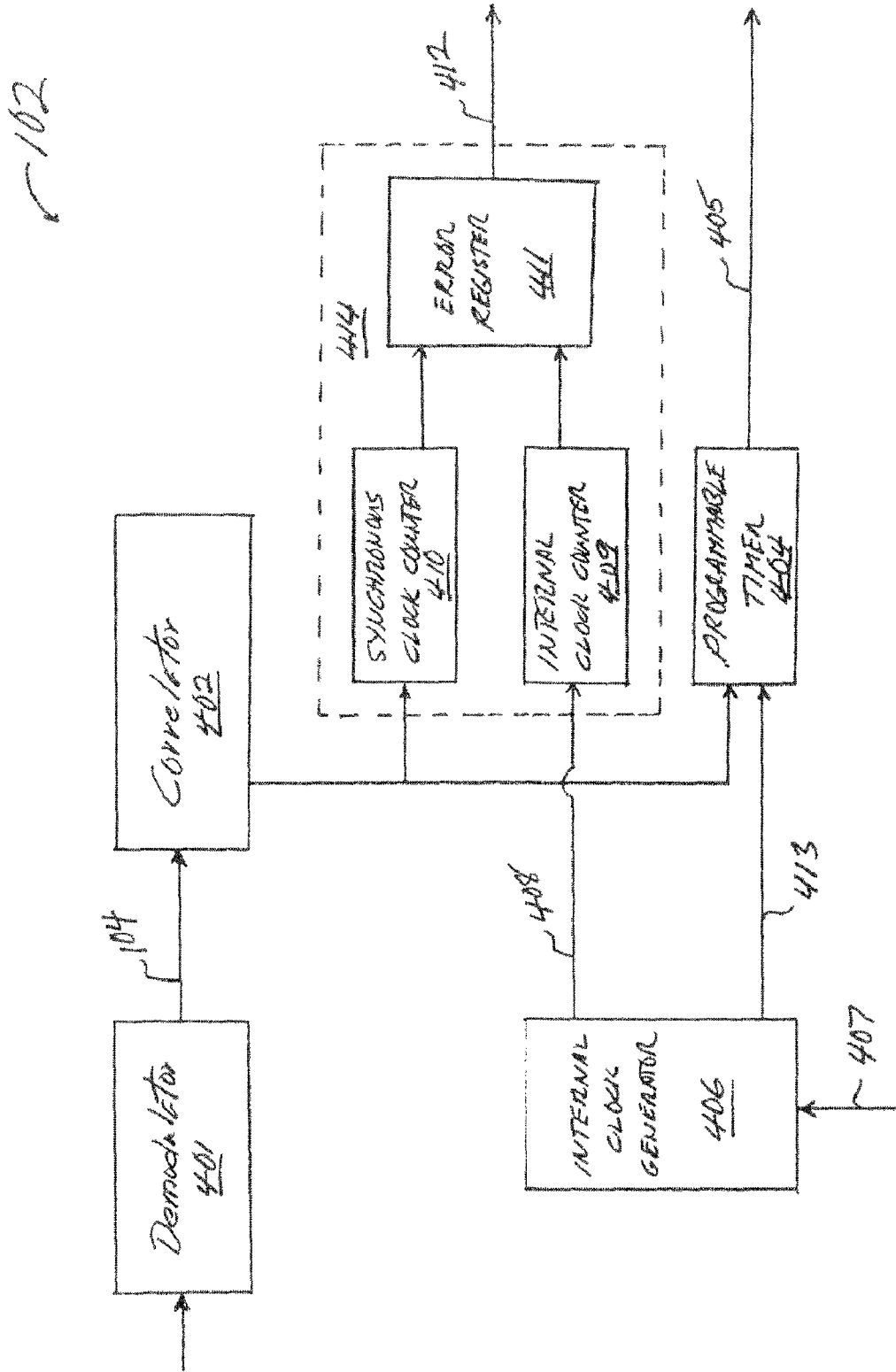
FIG. 4 illustrates a satellite controller in one embodiment of a synchronized auto wake-up time division multiplexed network.

FIG. 4 illustrates one embodiment of a satellite controller 102. As illustrated in FIG. 4, each satellite controller may include a demodulator 401 to extract the synchronization codes 104 from a transmission from central controller 101. Demodulators are known in the art and will not be described in detail here. Demodulator 401 may be coupled to a programmable correlator 402, which correlates the synchronization codes 104 with a programmed address code in the programmable correlator 402. Programmable correlators are known in the art and will not be described in detail here. When the programmed address code correlates with one of the synchronization codes 104, the programmable correlator 402 generates a synchronous clock signal 403. Satellite controller 102 may also include an internal clock generator 406. Internal clock generator 406 may receive a local clock signal 407 from a peripheral device 501 associated with the satellite controller, as illustrated in FIG. 5. Internal clock generator 406 may be a prescaler that scales the local clock signal to one or more internal clock signals, such as internal clock signals 408 and 413. Internal clock signals 408 and 413 may have different clock frequencies. Internal clock signal 408 may be commensurate in frequency with synchronous clock signal 403. For example, local clock signal 407 may be a 32 KHz clock signal and synchronous clock signal 403 may be a 4 Hz clock signal derived, for example, from periodic synchronization code 104-2 (see FIG. 1). Internal clock generator 406 may then scale the local clock signal by a factor of 8,000 (32,000/4= 8,000) to generate internal clock signal 408.

Synchronous clock signal 403 and internal clock signal 408 may be coupled to synchronous comparator 414 which may include synchronous clock counter 410, internal clock counter 409 and programmable error register 411. Synchronous clock counter 410 may be coupled to synchronous clock signal 403 to count synchronous clock signal 403 and to accumulate a synchronous clock count. Internal clock signal 408 may be coupled to internal clock counter 409 to count internal clock signal 408 and to accumulate an internal clock signal count. Programmable error register 411 may be coupled to internal clock counter 409 and synchronous clock counter 410. Programmable error register 411 may be programmed to detect a difference between the synchronous clock count accumulated by synchronous clock counter 410 and the internal clock count accumulated by internal clock counter 409. Programmable error register 411 may then generate an error signal 412 if the difference between the synchronous clock count and the internal clock count is greater than a programmed value. It will be appreciated that error signal 412 may be generated when local clock signal 407 is not synchronized with system clock 304. Error signal 412 may also be generated when satellite controller 102 does not receive synchronization codes 104. Error signal 412 may be used as shown in FIG. 5, for example, as an auto wake-up signal to wake-up a peripheral device 501 to enable peripheral device 501 to re-synchronize its clock with the central controller 101 via a communication link 502.

Figure 6A:
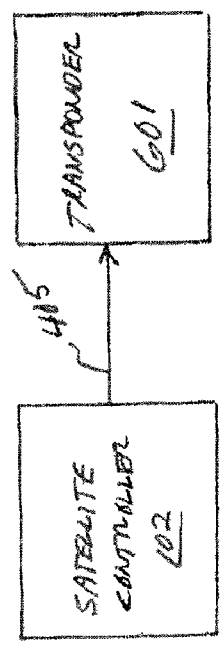
FIG. 6A illustrates an auto-response device in an embodiment of a synchronized auto wake-up time division multiplexed network.

As shown in FIG. 4, synchronous clock signal 403 may also be coupled to a programmable timer 404, which may also be coupled to internal clock signal 413. Synchronous clock signal 403 may trigger programmable timer 404, and internal clock signal 408 may clock programmable timer 404. Programmable timer 404 may be programmed to generate a response signal 405 at a time when no other satellite controller 102 in a group of satellite controllers 103-1 through **103-*n* is responding to the central controller 101. That is, response signal 405 may be used to time a time division multiplexed response from the satellite controller 102 to the central controller 101. The response signal 405 may be used to trigger a time division multiplexed response by any convenient means, such as turning on a transponder 601 as shown in FIG. 6A, to send an acknowledgement to the central controller that one of the synchronization signals 104 was received and recognized. The acknowledgement may be, for example, the same synchronization code 104-1 through 104-*n* received by the satellite controller 102, a hardware address code unique to the satellite controller 102, an electronic product code associated with the transponder 601**, or any kind of signal that the central controller might recognize or count.

Figure 6B:
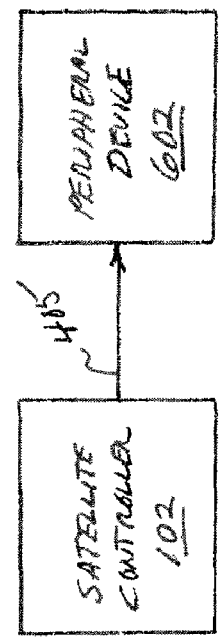
FIG. 6B illustrates one embodiment of auto-wake-up in a synchronized auto wake-up time division multiplexed network.

Alternatively, response signal 405 may be used for another purpose, such as switching a peripheral device between two states, such as peripheral device 602 in FIG. 6B, in which case the programmable timer 404 may be viewed as a timed switch or a programmable interrupt timer. Peripheral device 602 may include, for example, a switch (e.g., a flip-flop, a register or a programmable memory element), a microcontroller or other processor that is switched from one state to another (e.g., between an active state and an inactive state), or a controller system or subsystem that is capable of being switched or triggered. An example of a system might be a programmable system on a chip (PSoC™) such as a member of the CY82xxxx family of microcontrollers manufactured by Cypress Semiconductor Corporation of San Jose, Calif. An example of a subsystem might be a wireless USB (WUSB) transceiver, such as a WUSB transceiver manufactured by Cypress Semiconductor Corporation of San Jose, Calif., having a low power digital section and a radio frequency (RF) section. In order to conserve power, the RF section may be maintained in an off or sleep state until response signal 405 is received.

It will be appreciated that multiple instances of programmable timer 404, with independently programmable time delays, may be used to generate multiple instances of response signal 405 to time multiple events (e.g., activating and deactivating multiple peripheral devices, components or subsystems). Continuing the example of the WUSB transceiver cited above, an auto wake-up sequence might proceed in two or more steps, such as powering up an onboard oscillator with a first response signal 405, and allowing time for the oscillator to stabilize before powering up a transmitter section with a second response signal 412.

Figure 7:
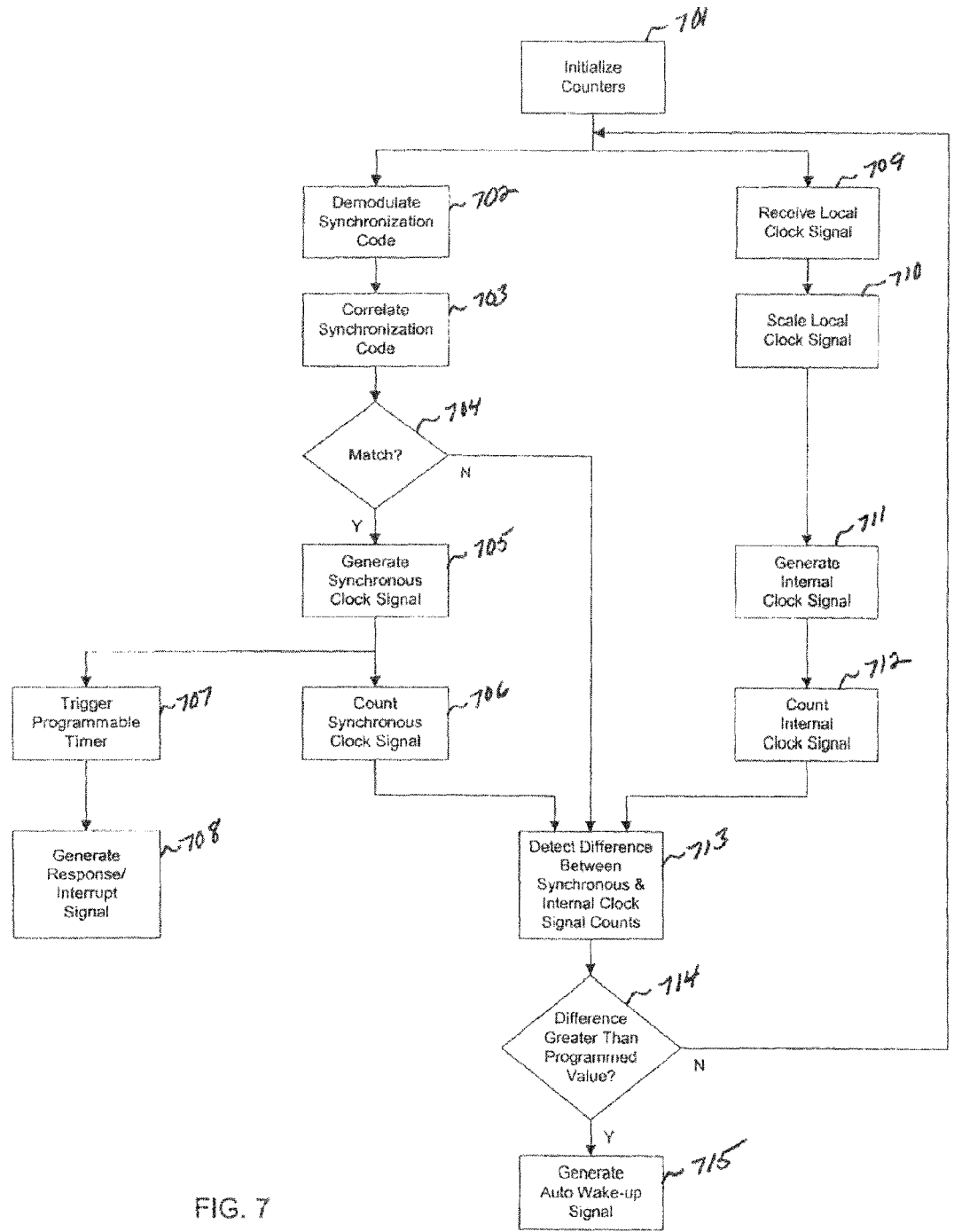
FIG. 7 is a flowchart illustrating one embodiment of a method for a synchronized auto wake-up time division multiplexed network.

FIG. 7 is a flowchart illustrating one embodiment of a method for a synchronized auto wake-up time division multiplexed network. The method begins at step 701 where internal clock counter 409, synchronous clock counter 410 and one or more programmable timers 404 are initialized by conventional means (e.g., a reset command or auto-reset on power-up). At step 702, satellite controller 102 demodulates a synchronization code 104. At step 703, the demodulated synchronization code 104 is correlated with a programmed code in correlator 402. At step 703, the correlation result determines if a match exists between the synchronization code 104 and the programmed code. If a match exists at step 704, the method continues at step 705 where the synchronous clock signal 403 is generated. At step 706, the synchronous clock signal is counted by synchronous clock counter 410 and accumulated in a synchronous clock signal count. At approximately the same time, synchronous clock signal 403 triggers one or more programmable timers 404 at step 707 and the one or more programmable timers generate response and/or interrupt signals 405 at step 708. If there is no match between the synchronization code 104 and the programmed code at step 704, the method bypasses steps 705 and 706 such that the synchronous clock signal count is not incremented in synchronous clock counter 410. At step 709, and approximately in parallel with steps 702 through 706, a local clock signal 407 is received by internal clock generator 406. Internal clock generator 406 scales the local clock signal 407 at step 710, and generates an internal clock signal 408 at step 711. At step 712, the internal clock signal 408 is counted by the internal clock counter 409 and accumulated in an internal clock signal count. At step 713, the synchronous clock signal count is compared with the internal clock signal count. Step 714 determines if the difference between the internal clock signal count and the synchronous clock signal count is greater than a programmed value. If the difference is greater than the programmed value, then an auto-wakeup signal 412 is generated at step 715. If the difference is less than or equal to the programmed value at step 714, the method continues at steps 702 and 709.

It will be apparent from the foregoing description that aspects of the present invention may be embodied, at least in part, in software. That is, the techniques may be carried out in a computer system or other data processing system in response to its processor, such as a microprocessor, executing sequences of instructions contained in a memory, such as central controller memory 302 or a programmed device such programmable correlator 402. In various embodiments, hardwired circuitry may be used in combination with software instructions to implement the present invention. Thus, the techniques are not limited to any specific combination of hardware circuitry and software, nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor or controller, such as the processor 301 or the controller 102.

A machine-readable medium can be used to store software and data which when executed by a data processing system causes the system to perform various methods of the present invention. This executable software and data may be stored in various places including, for example, memory 302 or correlator 402. Portions of this software and/or data may be stored in any one of these storage devices.

Thus, a machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable and non-recordable media (e.g., read only memory (ROM); random access memory (RAM); magnetic disk storage media; optical storage media; flash memory devices; organic or inorganic storage media, etc.), as well as electrical, optical, acoustical or other forms of propagated signals (e.g., carrier waves, infrared signals, digital signals, etc.).

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method, comprising:
    recognizing, by at least one of a plurality of satellite controllers, one or more synchronization codes of a plurality of synchronization codes transmitted by a central controller, wherein for each of the at least one of the plurality of satellite controllers, the method further comprises:
        generating, by a synchronous clock signal generator, a synchronous clock signal each time the satellite controller recognizes the one or more synchronization codes of the plurality of synchronization codes; and
        generating, by an internal clock signal generator, an internal clock signal.

2. The method of claim 1, further comprising:
    transmitting, by the central controller, the plurality of synchronization codes through a transmission medium to the plurality of satellite controllers.

3. The method of claim 2, wherein the transmission medium comprises a wireless radio frequency medium.

4. The method of claim 1, wherein recognizing comprises recognizing, by each of the plurality of satellite controllers, one or more synchronization codes of the plurality of synchronization codes transmitted by the central controller.

5. The method of claim 4, wherein the plurality of satellite controllers comprises a first satellite controller group, and wherein the method further comprises, for each satellite controller in the first satellite controller group:
    recognizing a first synchronization code of the plurality of synchronization codes; and
    generating a first synchronous clock signal in response to the first synchronization code.

6. The method of claim 5, wherein each satellite controller in the first satellite controller group further comprises a programmable timer coupled with the synchronous clock signal generator and the internal clock signal generator, and wherein the method further comprises triggering each programmable timer by the first synchronous clock signal, to be clocked by the internal clock signal and to time a response to the central controller.

7. The method of claim 6, further comprising timing the response to the central controller of each satellite controller in the first satellite controller group to avoid interference with a response from any other satellite controller in the first satellite controller group.

8. The method of claim 6, wherein the one or more synchronization codes are periodic synchronization codes, further comprising a synchronous comparator coupled to the internal clock signal generator and to the synchronous clock signal generator, and wherein the method further comprises:
    counting, by the synchronous comparator, the synchronous clock signal each time the one or more synchronization codes is recognized to accumulate a synchronous clock signal count; and
    counting, by the synchronous comparator, the internal clock signal to accumulate an internal clock signal count.

9. The method of claim 8, further comprising:
    detecting, by the synchronous comparator, a difference between the synchronous clock signal count and the internal clock signal count;
    generating an error signal when the difference between the synchronous clock signal count and the internal clock signal count exceeds a programmed value; and
    activating a peripheral device with the error signal.

10. The method of claim 9, wherein the peripheral device is a microcontroller.

11. The method of claim 9, wherein the peripheral device is a wireless universal serial bus (WUSB) transceiver.

12. The method of claim 9, wherein the peripheral device is a switch.

13. The method of claim 5, wherein the plurality of satellite controllers further comprises a second satellite controller group, and wherein the method, by each satellite controller in the second satellite controller group, further comprises:
    recognizing a second synchronization code of the plurality of synchronization codes, the second synchronization code different from the first synchronization code; and generating a second synchronous clock signal in response to the second synchronization code.

14. The method of claim 13, wherein each satellite controller in the second satellite controller group further comprises a programmable timer coupled with the synchronous clock signal generator and the internal clock signal generator, and wherein the method further comprises triggering each programmable timer by the second synchronous clock signal, to be clocked by the internal clock signal and to time a response to the central controller.

15. The method of claim 14, further comprising timing the response to the central controller of each satellite controller in the second satellite controller group to avoid interference with a response from any other satellite controller in the second satellite controller group and with a response from any other satellite controller in the first satellite controller group.

16. The method of claim 1, further comprising:
triggering a programmable timer, coupled with the synchronous clock signal generator and the internal clock signal generator, with the synchronous clock signal;
clocking the programmable timer with the internal clock signal; and
switching a peripheral device, using the programmable timer, between a first state and a second state.

17. The method of claim 16, wherein the peripheral device is a microcontroller, the first state comprises an inactive state and the second state comprises an active state.

18. The method of claim 16, wherein the peripheral device is a wireless universal serial bus (WUSB) transceiver and the first state comprises an inactive state and the second state comprises an active state.

19. The method of claim 16, wherein the peripheral device comprises a switch.

20. The method of claim 19, wherein the switch is a component selected from a group consisting of a register, a flip-flop or a programmable memory element.

* * * * *

UNITED STATES PATENT AND TRADEMARK OFFICE
CERTIFICATE OF CORRECTION

PATENT NO. : 8,315,202 B1
APPLICATION NO. : 12/467909
DATED : November 20, 2012
INVENTOR(S) : Francis Page 1 of 1

It is certified that error appears in the above-identified patent and that said Letters Patent is hereby corrected as shown below:

In Column 2, Line 19, delete "ell-known" and insert -- well-known --, therefor.

In Column 2, Line 50, delete "tuner," and insert -- timer, --, therefor.

Signed and Sealed this
Twelfth Day of March, 2013

Teresa Stanek Rea
*Acting Director of the United States Patent and Trademark Office*